US012386953B2

(12) United States Patent
Yadav et al.

(10) Patent No.: US 12,386,953 B2
(45) Date of Patent: Aug. 12, 2025

(54) USING BACKUP META-DATA AND ANALYTICS FOR DETECTING CYBER-ATTACKS

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 17/957,329

(22) Filed: Sep. 30, 2022

(65) Prior Publication Data

US 2024/0111861 A1    Apr. 4, 2024

(51) Int. Cl.
*G06F 21/55*    (2013.01)

(52) U.S. Cl.
CPC ...... *G06F 21/554* (2013.01); *G06F 2221/034* (2013.01)

(58) Field of Classification Search
CPC ................. G06F 21/554; G06F 2221/034
See application file for complete search history.

(56) References Cited

U.S. PATENT DOCUMENTS

| | | | |
|---|---|---|---|
| 7,774,315 B1* | 8/2010 | Galker | G06F 11/1458 707/645 |
| 2015/0293896 A1* | 10/2015 | Runkis | G06F 3/0623 707/755 |
| 2017/0177867 A1* | 6/2017 | Crofton | G06F 21/565 |
| 2020/0241962 A1* | 7/2020 | Dain | G06F 16/1748 |
| 2022/0237084 A1* | 7/2022 | Bhagi | G06F 11/2097 |
| 2023/0239321 A1* | 7/2023 | Doshi | H04L 63/1466 726/23 |

* cited by examiner

*Primary Examiner* — Lynn D Feild
*Assistant Examiner* — Vladimir I Gavrilenko
(74) *Attorney, Agent, or Firm* — Chamberlain, Hrdlicka, White, Williams & Aughtry; Aly Z. Dossa

(57) ABSTRACT

Embodiments of the invention relate to generating backups of assets. More specifically, in one or more embodiments of the invention, the meta-data generated during the backups is leveraged for detecting cyber-attacks by leveraging backup meta-data, to reduce the amount of data that needs to be scanned by a cyber-security module to detect a cyber-attack, such as a ransomware attack. This allows any attacks to be detected earlier and reduce processing by leveraging the periodic backups that are performed as part of data protection, to detect when an attack has or is occurring. By making these determinations, a quick identification of possible ransomware attacks may be made and other methods of mitigating the attack may be deployed when the method of mitigating the attack might still be useful to mitigate potential damage to a user's data.

17 Claims, 3 Drawing Sheets

USING BACKUP META-DATA AND ANALYTICS FOR DETECTING CYBER-ATTACKS

BACKGROUND

As people increasingly rely on computing systems and devices to perform a plethora of tasks; the systems have become increasingly complex, and the opportunities for failure and/or loss of important data has also increased. To prevent loss of important data, performing a backup on the file-system of a computing system is necessary to prevent loss of data if a system failure occurs or cyber-attacks, such as ransomware, are directed towards the system. File-system backups leverage a file-based backup philosophy to protect the underlying data. This underlying mechanism is leveraged not just to protect the file-system on a host, but also to protect workflows in network attached storage.

SUMMARY

In general, certain embodiments described herein relate to a method for performing a backup. The method comprises of initiating, by a user, an initial backup of a production host and storing a copy of the initial backup's meta-data in a cyber-security module's vault. The method then continues to periodically perform subsequent backups of the production host and sends the subsequent backup's meta-data to the cyber-security module. The cyber-security module compares the subsequent backup's meta-data to the initial backup's meta-data to determine where changes have occurred in the production host. Once it is determined where changes have occurred in the production host, portions of the backup that correspond to the determined changes are sent to the cyber-security module. The cyber-security module then analyzes these portions to determine if the portions that correspond to the determined changes are corrupted. If corruption is found, the user is then notified.

In general, certain embodiments described herein relate to a non-transitory computer readable medium comprising computer readable program code, which when executed by a computer processor enables the computer processor to perform a method for performing a backup. The method comprises of initiating, by a user, a backup of a production host and storing a copy of the backup's meta-data in a cyber-security module's vault. The method then continues to periodically perform subsequent backups of the production host and then the method sends the subsequent backup's meta-data to the cyber-security module. The cyber-security module compares the subsequent backup's meta-data to the backup's meta-data to determine where changes have occurred in the production host. Once it is determined where changes have occurred in the production host, portions of the backup that correspond to the determined changes are sent to the cyber-security module. The cyber-security module then analyzes these portions to determine if the portions that correspond to the determined changes are corrupted. If corruption is found, the user is then notified.

In general, certain embodiments described herein relate to a system comprising: a cyber-security module, a production host, and a backup agent which includes a processor, and memory. The memory includes instructions, which when executed by the processor, performs a method for performing a backup. The method comprises of initiating, by a user, a backup of a production host and storing a copy of the backup's meta-data in a cyber-security module's vault. The method then continues to periodically perform subsequent backups of the production host and sends the subsequent backup's meta-data to the cyber-security module. The cyber-security module compares the subsequent backup's meta-data to the backup's meta-data to determine where changes have occurred in the production host. Once it is determined where changes have occurred in the production host, portions of the backup that correspond to the determined changes are sent to the cyber-security module. The cyber-security module then analyzes these portions to determine if the portions that correspond to the determined changes are corrupted. If corruption is found, the user is then notified.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
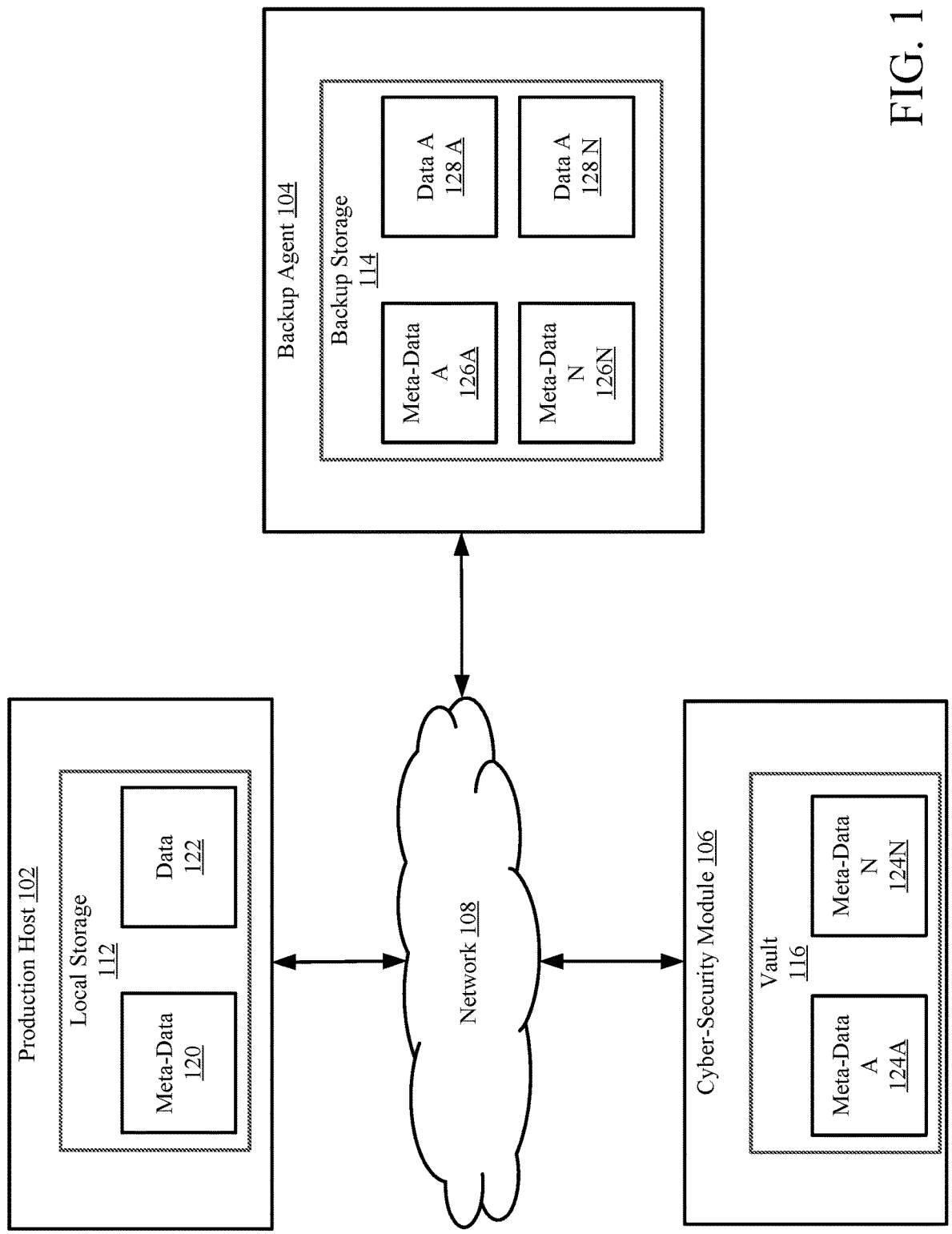
FIG. 1 shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology.

Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected", or "operative connection", means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

When ransomware and other forms of cyber-attacks occur, data in either or both backup storage and/or in other forms of storage including working storage, is altered. This may comprise of altering meta-data, file headers, and/or full or partial file content corruption, such as encrypting the file. Generally, when any of these are corrupted by a ransomware attack, the backup data or working data is significantly altered such as a notable change in file size (for example, a word document changing from 2 megabytes (MB) to 130 bytes). Further, some forms of cyber-attack can potentially corrupt the files in such a way that their size and even hash values do not necessarily change, making detection increasingly difficult.

While means for detecting and mitigating, ransomware and other similar cyber-attacks are available, they are costly and require considerable time to scan the data. Further, they are often only employed when a ransomware attack is suspected. By the time the attack detected, it is often too late to prevent damage and/or stop potential spreading of the attack to other assets such as to backup files.

In general, one or more embodiments of the invention relates to systems and methods for detecting cyber-attacks by leveraging backup meta-data to reduce the amount of data that needs to be scanned by a cyber-security module to detect a cyber-attack such as a ransomware attack. This allows any attacks to be detected earlier and reduces processing by leveraging the periodic backups that are performed as part of data protection to detect when an attack has or is occurring. By making these determinations, a quick identification of possible ransomware attacks may be made and other methods of mitigating the attack may be deployed when the method of mitigating the attack might still be useful to mitigate potential damage to a user's data.

The following describes various embodiments of the invention.

FIG. 1 shows a diagram of a system in accordance with one or more embodiments of the invention. The system includes a production host (102), a backup agent (104), and cyber-security module (106). The system may include additional, fewer, and/or different components without departing from scope of the invention. Each component may be operably connected to any of the other component via any combination of wired and/or wireless connections including a network (108). Each component illustrated in FIG. 1 is discussed below.

In one or more embodiments of the invention, the system includes one or more production hosts (e.g., 102). While only one production host (e.g., 102) is shown, the production host (e.g., 102) may be part of a group that may include more production hosts without departing from the invention. For example, a group may comprise of three production hosts, at least sixteen production hosts, at least fifty production hosts, or at least a hundred production hosts without departing from the invention.

In one or more embodiments of the invention, the production host (102) performs workloads and provides services to clients and/or other entities not shown in the system illustrated in FIG. 1. The production host (102) may further include the functionality to perform computer implemented services for users (e.g., clients) of the system. The computer implemented services may include, for example, database services, electronic mail services, data processing services, etc. The computer implemented services may include other and/or additional types of services without departing from the invention.

In one or more embodiments of the invention, the production host (102) may provide application services by hosting applications. For example, the production hosts (102) may host any number of applications that provide application services to clients. Application services may include, but are not limited to, database services, electronic communication services, instant messaging services, file storage services, etc. Each of the production hosts may host any number of applications. Additionally, different production hosts may host the same number of applications or different numbers of applications. Different production hosts may also host similar or different applications.

In one or more embodiments of the invention, the production host (102) may host virtual machines (not shown) that host the above-discussed applications. The production host (102) may host any number of VMs that, in turn, host any number of applications.

The production host (102) may also, or in addition to, the backup agent (e.g., 104), provide backup storage services and include backup storage on the local storage (e.g., 112). The backup storage services may include storing backups of data stored on the shared storages for restoration purposes. The backup storage services may include other and/or additional services without departing from the invention. The production hosts (102) may also, or in addition to the cyber-security module (e.g., 106), provide cyber-security data protection services and/or provide storage for the cyber-security vault (e.g., 116) on the local storage (e.g., 112).

Figure 3:
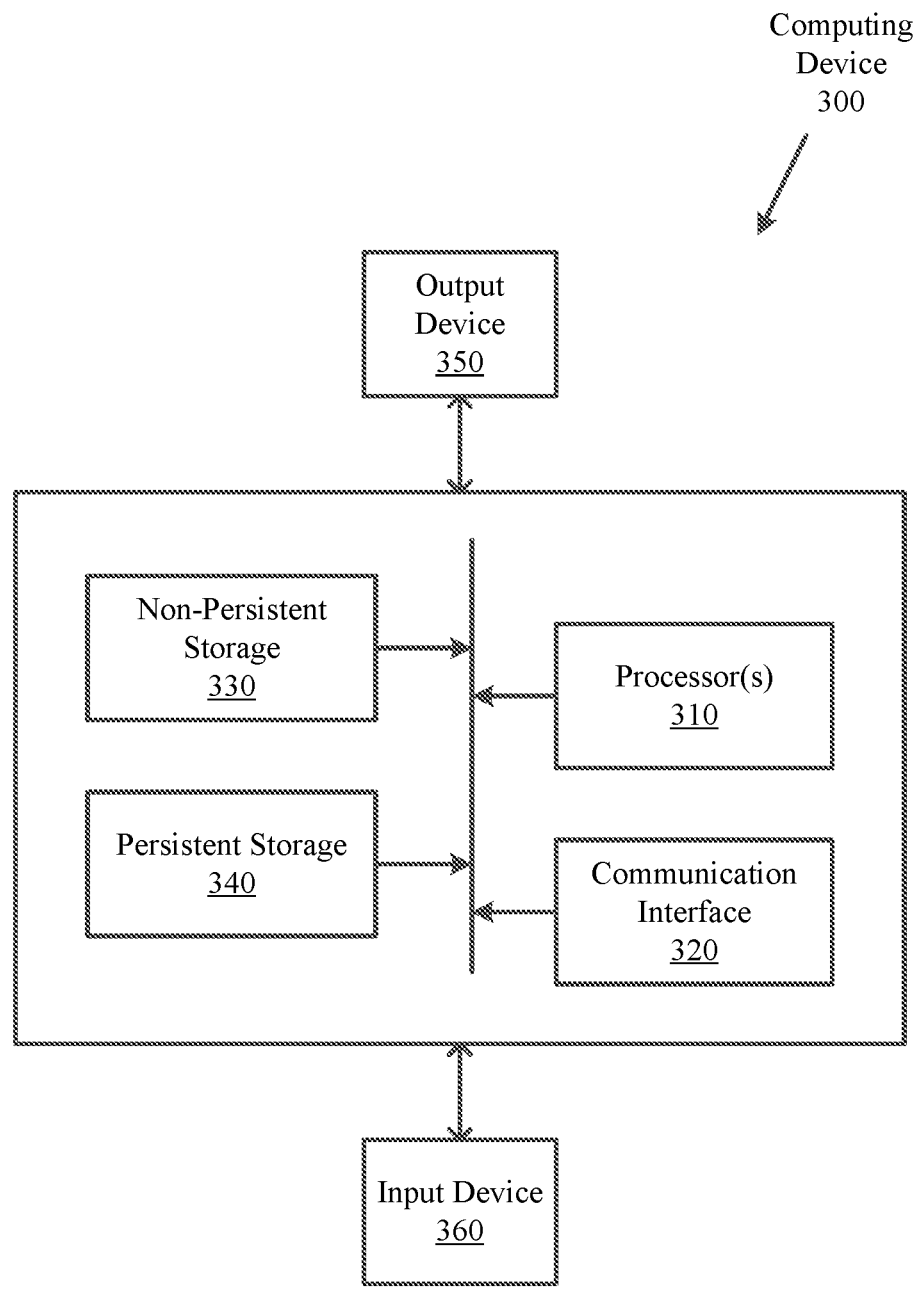
FIG. 3 shows a diagram of a computing device in accordance with one or more embodiments of the invention.

In one or more embodiments of the invention, the production host (102) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the production host (e.g., 102) described throughout this application.

In one or more embodiments of the invention, the production host (102) is implemented as a logical device. The logical device may utilize the computing resources of any number of computing devices and thereby provide the functionality of the production host (102) described throughout this application.

The production host (102). as well as other components of the system and connected devices, may perform data storage services. The data storage services may include storing, modifying, obtaining, and/or deleting data stored on the local storage (e.g., 112) based on instructions and/or data obtained from the production host (102) and/or other components of the system. The data storage services may include other and/or additional services without departing from the invention. The local storage (e.g., 112) may include any number of storage volumes without departing from the invention.

The production host (102) includes local storage (112) for storing assets such as files and folders, which may be made available to other hosts or other requesting components such as the backup agent (e.g., 104) or client computers (not shown). The local storage (112) may include one or more processors, memory (e.g., random access memory), and persistent storage (e.g., disk drives, solid state drives, etc.). In one or more embodiments of the invention, the local storage (112) may also or alternatively comprise of off-site storage, including but not limited to, cloud base storage, and long-term storage such as tape drives (depending on the particular needs of the user and/or the system). The production host (102) may also utilize shared storage including at least one group shared volume (CSV) (not shown). Other types of shared storage may also or alternatively be included, such as active-passive storage and local storage (e.g., 112).

The local storage (e.g., 112) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The local storage device (e.g., 112) may utilize any quantity of hardware storage resources of any number of computing devices for storing data. For example, the local storage (e.g., 112) may utilize portions of any combination of hard disk drives, solid state disk drives, tape drives, and/or any other physical storage medium of any number of computing devices.

The local storage (112) includes a file-system meta-data (120) and data (122). The file-system meta-data (e.g., 120) may be one or more data structures that include information regarding application data stored in the file-system (e.g., data 122). The information included in the file-system meta-data (e.g., 120) in one or more embodiments of the invention may be used for producing backups as will be described in more detail with regards to the method shown in FIG. 2. The information included in the file-system meta-data (120) in one or more embodiments of the invention may be additionally used by the backup agent (e.g., 104) to generate backups and historical meta-data as well as the cyber-security module (e.g., 106) to perform cyber-security scans and ransomware detection. The file-system meta-data (120) may include other and/or additional information without departing from the invention.

The local storage (e.g., 112), may include one or more data structures (e.g., 122) that may be used to generate backups (e.g., 128A-128N) of assets of the file-system of the production host (e.g., 102). The file-system meta-data (e.g., 120), may include data (also referred to as "asset data") generated by users of the application(s) as discussed above. The asset data may be any type of data such as, but not limited to, database data and email data generated by users of the application(s), without departing from the invention. Each application may include any number of assets. Each asset may include any quantity of asset data, and furthermore, each asset may include any number of elements without departing from the invention. Users including, individuals, including administrators, developers, etc., that use the system, may use the data (e.g., 122), stored on the local storage (112), when obtaining computer implemented services from the production host (e.g., 102). Additionally, the data, (e.g., 122), stored on the storage device (112) of the production host (102), may be obtained by the backup agents (e.g., 104) to generate backups. The data (e.g., 122), of the local storage device (112) may be used by other and/or additional entities for other and/or additional purposes without departing from the invention.

In one or more embodiments of the invention, the system includes one or more backup agents (e.g., 104). The backup agent (104) may generate backups and store them in a related backup storage device (e.g., 114). The backups are stored as data (e.g., 128A-128N) along with their meta-data (e.g., 126A-126N). The backups are generated based on backup policies and implemented by the backup agent (104) as will be described in more detail below with regards to the method shown in FIG. 2.

The backup policies may specify a schedule in which applications or other assets, such as, but not limited to, individual files or folders stored in the data (122) associated with a production host (e.g., 102) are to be backed up. The backup agent (104) may be triggered to provide file-system meta-data (e.g., 120), generate a backup (e.g., 128A-128N), and generate backup meta-data (e.g., 126A-126N) in response to a backup policy, or in response to a backup request triggered by a client, such as a user or administrator. The backup agent (104) may also provide the backup meta-data and/or backup data to the cyber-security module (e.g., 106) for analysis, as well as safe storage. The backup request may specify the applications(s) and/or assets including data (e.g., 122), such as files and folders associated with the applications to be backed up.

In one or more embodiments of the invention, the backup agent (104) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (102) described throughout this application.

In one or more embodiments of the invention, the backup agent (104) is implemented as computer instructions, e.g., computer code, stored on a persistent storage that when executed by a processor of the production hosts (e.g., 102) causes the production hosts (e.g., 102) to provide the functionality of the backup agent (e.g., 104) described throughout this application.

In one or more embodiments of the invention, the backup agent (e.g., 104) may provide backup services to the production host (e.g., 102). The backup services may include generation and storage of backups in the backup storage device (114). The backups services may also include restoration of the production host (e.g., 102) using the backups (e.g., 128A-128N) stored in the backup storage device (114).

The backup agent (104) may provide backup services to the production host (e.g., 102) by orchestrating: (i) generation of backups of the production host (e.g., 102), (ii) storage of backups (e.g., 128A-128N) of the production host (e.g., 102) on the backup storage device (114), (iii) consolidation of backup requests to reduce or prevent from generation of backups that are not useful for restoration purposes, and (iv) restoration of the production host (e.g., 102) to previous states using backups (e.g., 128A-128N) stored on the backup storage device (e.g., 114). The system may include any number of backup agents (e.g., 104) without departing from the scope of the invention.

As discussed above, in one or more embodiments of the invention, the backup agents (e.g., 104) produce backups including data (e.g., 128A-128N) and associated meta-data (e.g., 126A-126N) from a target file-system of the production host (e.g., 102). The backup agent (104) may include intelligent file-system crawlers (not shown) and/or other components as needed.

Additionally, to provide the backup services, the backup agent (e.g., 104) may include functionality to generate and issue instructions to any component of the system of FIG. 1. In one or more embodiments, the backup agent (e.g., 104) may also generate instructions in response to backup requests from other entities.

The meta-data (e.g., 126A-126N) and data (e.g., 128A-128N) are stored in the backup storage device (e.g., 114). The backup agent (104) may also include the functionality to provide meta-data (e.g., 126A-126N) and backup data (e.g., 128A-128N) to the production host (e.g., 102) and/or cyber-security module (e.g., 106) for restoration purposes, history monitoring purposes, cyber-security purposes, and/or other additional purposes without departing from the invention. The backup agent (e.g., 104) may include other and/or additional functionalities without departing from the invention. In another embodiment of the invention, the backup agent (e.g., 104) may be located on the production host (e.g., 102) or as part of the cyber-security module (e.g., 106) without departing from the invention.

The meta-data (e.g., 126A-126N) associated with the backups (e.g., 128A-128N), may be one or more data structures such as a database, that includes information related to the original location on the target production host (e.g., 102), information related to its current location in the backup's data (e.g., 128A-128N), relationship with other related files/applications and other pertinent information that may be configured by the user or administrator. This meta-data is produced when the backup is performed, as will be described in more detail below with regards to the method described in FIG. 2.

Once produced the meta-data (e.g., 126A-126N) may be used for quickly determining the contents of the backup, without having to perform a full restoration. As will be discussed in more detail below with regards to the method shown in FIG. 2, the meta-data (e.g., 126A-126N) may also be used by the cyber-security module (e.g., 106) or related component for determining when changes occur to the backup data (e.g., 128A-128N) and/or the file-system data (e.g., 122) of the production host (e.g., 102) that may be indicative of a cyber-security attack such as a ransomware attack.

At the time of a restoration, the meta-data (e.g., 126A-126N) may be used by the user or administrator to become better informed of the contents of a particular backup's data (e.g., 128A-128N). The user or administrator may also use the meta-data (e.g., 126A-126N) to determine individual files to restore from the backup rather than the entire backup.

In one or more embodiments of the invention, the backup agent (e.g., 104) is a physical device. The physical device may include circuitry. The physical device may be, for example, a field-programmable gate array, application specific integrated circuit, programmable processor, microcontroller, digital signal processor, or other hardware processors. The physical device may be adapted to provide the functionality of the backup agents (e.g., 104) described throughout this application.

In one or more embodiments of the invention, the backup agent (e.g., 104) is implemented as computer instructions, e.g., computer code, stored on a persistent storage that when executed, causes a processor to provide the functionality of the backup agent (e.g., 104) described throughout this application.

In one or more embodiments of the invention, the backup agent (e.g., 104) may generate such instructions in accordance with backup schedules that specify when backups are to be generated. In one or more embodiments, a backup schedule may provide specific points in time for a backup process to be performed.

In one or more embodiments of the invention, to satisfy the above-discussed backup schedules, the backup agent (e.g., 104) may monitor a backup window (e.g., four hours, eight hours, etc.) to perform a single backup and/or multiple backups. Additionally, the backup agent (e.g., 104) may pause an ongoing backup if the backup exceeded the backup window. The backup agent (e.g., 104) may then resume the paused backup while performing a sequential backup in a parallel manner based on the backup schedule.

In one or more embodiments of the invention, the backup agent (104) may include a backup storage device (e.g., 114) for providing data storage services. For example, the backup storage device (114) may store backups of the production host (e.g., 102) in persistent storage system associated with the backup storage device (114). Alternatively, in one or more embodiments of the invention the backups (e.g., 128A-128N) and associated meta-data (e.g., 126A-126N) may be stored in storage associated with the production host (e.g., 102).

In one or more embodiments of the invention, the backup storage device (114) stores data related to the backup (e.g., 128A-128N). The data stored in the backup storage device (114) may include backups of target data associated with applications of the target production host (e.g., 102). The backup storage device (114) may store any quantity of backups without departing from the invention. The backup storage device (114) may store full backups, incremental backups, or any combination or type of backup. The backup storage device (114) may store other and/or additional data without departing from the invention.

The backup storage device (114) may also provide copies of the backups (e.g., 128A-128N) and the backup meta-data (e.g., 126A-126N) to the backup agent (e.g., 104), production host (e.g., 102) and/or the cyber-security module (106). The system may include any number of backup storage devices (e.g., 114) and backups comprising backup data (e.g., 128A-128N) and associated meta-data (e.g., 126A-126N) without departing from the scope of the invention.

The backup storage device (e.g., 114) may be implemented using physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the backup storage device (114) may utilize portions of any combination of hard disk drives, solid state disk drives, tape drives, and/or any other physical storage medium of any number of computing devices.

In one or more embodiments of the invention, the backup storage device (114) may be implemented as computing devices (e.g., 300, FIG. 3). A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the backup storage device (e.g., 114) described throughout this application. Alternatively, in one or more embodiments of the invention, the backup storage device (e.g., 114) may also be implemented as a logical device, as discussed above.

In one or more embodiments of the invention, a cyber-security module (106) is provided. The cyber-security module includes a vault (116) which is a type of storage for safely securing data including meta-data (e.g., 124A-124N) related to backups. The cyber-security module (106) may interact with the production host (e.g., 102) and the backup agent (e.g., 104) to provide cyber-security services to the production host (e.g., 102) and/or the backup agent (e.g., 104).

As is discussed in more detail below with regards to the method shown in FIG. 2, in one or more embodiments of the invention, the cyber-security module (106) may monitor backup meta-data (e.g., 126A-126N) for changes that may indicate that a cyber-attack is in progress. The cyber-security module (106) may also obtain backup data (e.g., 128A-128N) from the backup storage (e.g., 114) and/or local data (e.g., 122) form the production host (e.g., 102) for monitoring.

The cyber-security module (106) includes hardware and/or applications that perform cyber-security functions. These functions include but are not limited to detecting ransomware, trojans, viruses, worms, botnets, and/or other types of malware. The cyber-security module (106) may include advance analytics and other applications for detecting malware. The cyber-security module may be maintained by an administrator, manufacture, third-party, or other user of the system. The cyber-security module (106) and/or its vault (116) may be air-gapped (not connected to external and/or internal networks), except when receiving data for scanning from the production host (e.g., 102) and/or backup agent (e.g., 104).

In one or more embodiments of the invention, the cyber-security module (106) stores copies of the meta-data (124A-124N) in a vault (116). This allows a copy of the original meta-data to be maintained and not affected by any malicious outside influences. By comparing the backup meta-data (e.g., 124A-124N) stored in the cyber-security vault (e.g., 116) to backup meta-data (e.g., 126A-126N) not stored in the vault, the cyber-security module may detect when changes have occurred to the backup that may be indicative of the data becoming corrupted or of a cyber-attack. The meta-data (e.g., 124A-124N) stored in the vault (116) may also be leveraged to determine which backups and/or parts of the backups are useful for restoring the production host's data (e.g., 122) after a cyber-attack or as a result of corruption of at least some of the backup data (e.g., 128A-128N).

The vault (e.g., 116) may be implemented using physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the vault (116) may utilize portions of any combination of hard disk drives, solid state disk drives, tape drives, and/or any other physical storage medium of any number of computing devices.

In one or more embodiments of the invention, the cyber-security module (106) may include machine learning or AI for detecting changes in data that are indicative of a cyber-attack. By monitoring the meta-data (e.g., 126A-126N) and/or backup data (e.g., 128A-128N) produced during one or more backups for changes in the data, the cyber-security module (106) may detect when changes occur in the data that may be indicative of a cyber-attack such as a ransomware attack. Such indications may be, but not limited to, a detection that a hash value of the data unexpectedly changes or changes more than a preset threshold. Other unexpected changes that may be indicative of a cyber-attack are changes in file type, encryption, and file size. The cyber-security module (106) also includes the ability to be updated. This allows the cyber-security module (106) to be able to detect future threats that are not currently anticipated.

In one or more embodiments of the invention, the cyber-security module (106) may include functionality to use services provided by the production host (e.g., 102). For example, the cyber-security module may use graphical user interfaces (GUI) provided by the production host (102) to alert a user that a cyber-attack may be occurring, or to receive feedback form a user or administrator of the system.

In one or more embodiments of the invention, the cyber-security module (e.g., 106) may be implemented as computing devices (e.g., 300, FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the cyber-security module (e.g., 106) described throughout this application.

Alternatively, in one or more embodiments of the invention, the cyber-security module (e.g., 106) may also be implemented as logical devices, as discussed above.

In one or more embodiments of the invention, the production host (e.g., 102), the backup agent (e.g., 104), the cyber-security module (e.g., 106) as well as other components of the system such as clients (not shown) communicate through a network (108). The network (108) may take any form, including any combination of wireless and/or wired networks. The network (108) may be a local network (LAN) or a wide area network (WLAN) including the Internet, or a private enterprise network that connects more than one location. The network (108) may be any combination of the above networks, other known network, or any combination of network types.

In one or more embodiments of the invention, the network (108) allows the system to communicate with other systems and external computing devices such as (but not limited to) a client. The various components of the system may also communicate with each other through the network. The network may be a high-speed internal network and/or include part of an external network (e.g., 108). The production host (e.g., 102), backup agent (e.g., 104) and cyber-security module (e.g., 106) communicate with each other over the internal network and in one or more embodiments of the invention provide fallback functionality.

A network (e.g., 108) may refer to an entire network or any portion thereof (e.g., a logical portion of the devices within a topology of devices). A network may include a data center network, a wide area network (WAN), a local area network (LAN), a wireless network, a cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1, the network (108) may include any number of devices within any components (e.g., 102, 104, and 106) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

Figure 2:
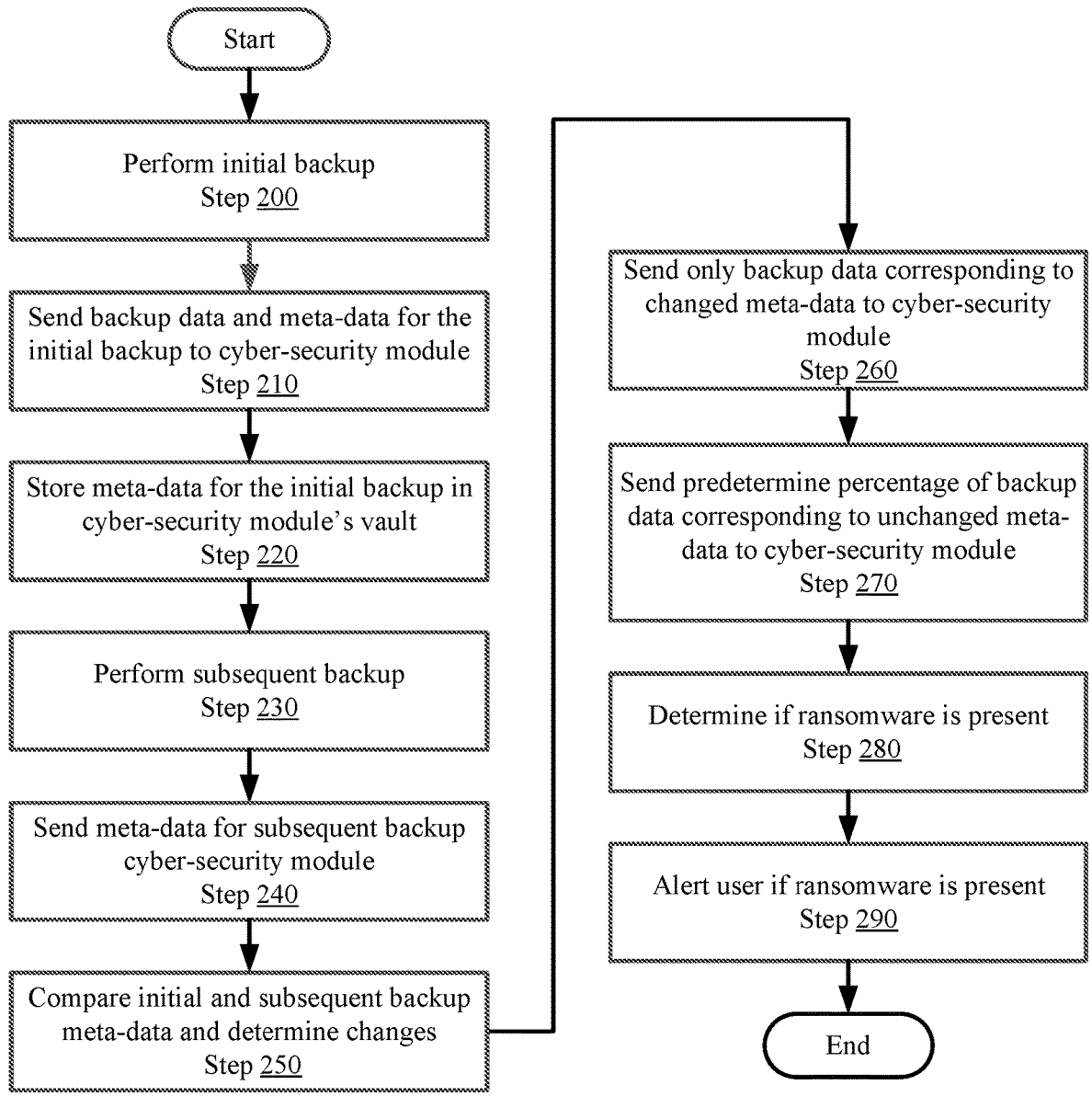
FIG. 2 shows a flowchart of a method of generating a backup in accordance with one or more embodiments of the invention.

FIG. 2 shows a flowchart of a method for generating a backup in accordance with one or more embodiments of the invention. The method may be performed by, for example, a backup agent (e.g., 104, FIG. 1) and/or the cyber-security module (e.g., 106, FIG. 1). Other components of the system illustrated in FIG. 1 may perform all, or a portion of the method of FIG. 2 without departing from the invention. While FIG. 2 is illustrated as a series of steps, any of the steps may be omitted, performed in a different order, additional steps may be included, and/or any or all the steps may be performed in a parallel and/or partially overlapping manner without departing from the invention.

In step 200, the system receives a backup request and performs an initial backup of data on the production host (e.g., 102, FIG. 1).

In one or more embodiments of the invention, the backup is started based on a backup generation event that is identified by the backup agent (e.g., 104, FIG. 1) at a point in time specified by a backup policy associated with the generation of a backup of the production host (e.g., 102, FIG. 1). In one or more embodiments of the invention, the backup may also or alternatively be started after the system obtains a message from a client requesting the generation of a backup of the production host.

In one embodiment, the backup agent (e.g., 104, FIG. 1) may include a backup policy associated with the production host (e.g., 102, FIG. 1) that specifies points in time to generate backups of the production host's file-system. The backup agent may monitor the backup policy and identify when a point in time specified by the backup policy occurs. The backup policy may include an identifier associated with the production host corresponding with the backup policy. The identification of the point in time specified by the backup policy may result in the identification of the backup generation event by the backup agent.

Alternatively, in one or more embodiments of the invention, a user, administrator, or other client of the system may send a message to the backup agent. The message may include a request to generate a backup of the production host. The message may include an identifier associated with the production host. The backup agent may identify obtaining the aforementioned message as the backup generation event. The backup generation event initiating a backup of a target may be identified by other and/or additional methods without departing from the invention.

The message or backup policy may additionally include instructions or policies for performing the backup, as well as performing cyber-security checks utilizing the cyber-security module (e.g., 106, FIG. 1). The policy or instructions may include such things as when and how often a subsequent backup should be performed. Other instructions may include what percentage of unchanged data should be scanned by the cyber-security module. The user, administrator, or application may provide the instructions and configurations when configuring the initial backup or at any time, when the configuration is needed as a result of a change to either the production host, cyber-security risks, and/or user administrator preferences.

In one or more embodiments of the invention, an intelligent file-system crawler or other component of the backup agent (e.g., 104, FIG. 1) collects the file-system meta-data (e.g., 120, FIG. 1), from the file-system of the production host (e.g., 102, FIG. 1). Meta-data for each file and folder is collected and stored in a backup meta-data file (e.g., 126A, FIG. 1). This file may take the form of a database or other similar type of file that may allow for easy analysis of the file-system meta-data. The file may take other forms without deviating from the scope of the disclosed invention.

Once the initial backup is performed in step 200, backup data (e.g., 128A, FIG. 1) and its related meta-data (e.g., 126A, FIG. 1) is saved in the backup storage (e.g., 114, FIG. 1) and also sent to the cyber-security module (e.g., 106, FIG. 1) for analysis in step 210. As discussed above, the cyber-security module (e.g., 106, FIG. 1) utilizes analytics and/or machine learning to determine if the initial data has any cyber-security issues such as ransomware. If it is determined that ransomware or other threats are present, the user may be alerted and/or mitigation (such as, but not limited to, quarantining, or deleting infected data) may be performed on the local storage (e.g., 112, FIG. 1).

Once the cyber-security module receives at least the meta-data for the initial backup in step 210, the cyber-security module saves the meta-data in step 220, to its vault (e.g., 116, FIG. 1). This assures that the meta-data (e.g., 124A) does not become corrupted at a later time. It also provides a pristine copy of the backup meta-data to compare with future backup's meta-data in order to determine if changes in the meta-data have occurred.

Once steps 200-220 are completed, and the initial backup is completed, the backup agent (e.g., 104, FIG. 1) or other component of the system performs subsequent backups in step 230. These may be incremental backups or full backups depending on the configuration of the backup and its initial setup. The backups are performed much the same way the initial backup is performed, and the data and meta-data from the backup is saved as additional backup meta-data (e.g., 126N, FIG. 1) and additional backup data (e.g., 128N, FIG. 1). As many subsequent backups may be performed as desired or as instructed by the backup's parameters. Subsequent backups may be performed periodically (for example, every day, or a greater period of time), or may be performed when requested by a user or administrator.

Each time a subsequent backup is performed in step 230, meta-data for the subsequent backup is sent to the cyber-security module in step 240. The meta-data is then compared to initial meta-data (e.g., 124A, FIG. 1) and any subsequent meta-data (e.g., 124N, FIG. 1) stored in the cyber-security vault (e.g., 116, FIG. 1). In step 250, any changes detected in the meta-data between the initial or the most recent previous backup's meta-data is determined.

In step 260, the cyber-security module or related module then requests for scanning the backup data for only the data corresponding to the parts of the meta-data that have changed. By requesting only, the backup data that has changed, the amount of data that needs to be scanned may be decreased, while still ensuring that any new ransomware or other forms of cyber-attack will be detected.

Once step 260 is completed, the method proceeds to step 270. In step 270, in accordance with one or more embodiments of the invention, a predetermined percentage of backup data corresponding to unchanged meta-data is also sent to the cyber-security module. This is done to detect any cyber-attacks that alter the meta-data in an un-detectable way. The method includes selecting a percentage of the unchanged data randomly. The unchanged data may be chosen using a random number generator to choose specific files and/or folders (by their address as recorded in the meta-data) for analysis. Alternatively, specific blocks of data may be chosen randomly using similar methods to choose specific files and/or folders.

Other methods of choosing backup data that corresponds to unchanged meta-data may also be used instead of or in combination with the random selection. For example, in a non-limiting example, if it is known that certain files are frequent initial targets for a particular type of cyber-attack, despite the meta-data for those files not having changed, the method, in one or more embodiments of the invention, may choose to send the backup data for those files, along with the randomly selected data, to be scanned. In one or more embodiments of the invention, these specific files may be chosen and updated by a user, administrator, manufacture, or provider when new threats make such a scan desirable.

The specific predetermined percentage of backup data corresponding to un-changed meta-data may be determined by a user or administrator when the backup is configured, based on the criticality of the particular data. The specific predetermined percentage may also be determined and/or increased when previous cyber-attacks are noticed. The percentage may be any amount, including, but not limited to 5%, 10% or any other percentage of the un-changed meta-data that a user or administrator deems is sufficient to detect any ransomware or other cyber-attacks. Additionally, in one or more embodiments of the invention, if the meta-data or backup data is found to include any corruption, or if previous scans are inconclusive, the percentage may be automatically increased in order to provide a bigger sample size, and for better analysis by the cyber-security module described in step 280.

Once step 270 is performed, or alternatively, after step 260 is completed, in one or more embodiments of the invention, the method proceeds to step 280. In step 280, the cyber-security module determines if ransomware or other forms of cyber-attacks are present by scanning the backup data corresponding with the changed meta-data, as well as the predetermined percentage of backup data corresponding to unchanged meta-data data in step 270. If ransomware is detected, the user or administrator is alerted in step 290 and appropriate mitigation actions is taken.

The method may end following step 290.

While the method described in FIG. 2 relates to an initial backup and subsequent backups, the method may be used to analyze any set of backups.

Additionally, as discussed above, embodiments of the invention may be implemented using computing devices. FIG. 3 shows a diagram of a computing device in accordance with one or more embodiments of the invention. The computing device (300) may include one or more computer processors (310), non-persistent storage (330) (e.g., volatile memory, such as random access memory (RAM), cache memory), persistent storage (340) (e.g., a hard disk, an optical drive such as a compact disk (CD) drive or digital versatile disk (DVD) drive, a flash memory, etc.), a communication interface (320) (e.g., Bluetooth interface, infrared interface, network interface, optical interface, etc.), input devices (360), output devices (350), and numerous other elements (not shown) and functionalities. Each of these components is described below.

In one embodiment of the invention, the computer processor(s) (310) may be an integrated circuit for processing instructions. For example, the computer processor(s) may be one or more cores or micro-cores of a processor. The computing device (300) may also include one or more input devices (360), such as a touchscreen, keyboard, mouse, microphone, touchpad, electronic pen, or any other type of input device. Further, the communication interface (320) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (350), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (310), non-persistent storage (330), and persistent storage (340). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating backups of assets. More specifically, in one or more embodiments of the invention the meta-data generated during the backups is leverage for detecting cyber-attacks by leveraging backup meta-data, to reduce the amount of data that needs to be scanned by a cyber-security module to detect a cyber-attack, such as a ransomware attack. This allows any attacks to be detected earlier and reduce processing by leveraging the periodic backups that are performed as part of data protection, to detect when an attack has or is occurring. By making these determinations, a quick identification of possible ransomware attacks may be made and other methods of mitigating the attack may be deployed when the method of mitigating the attack might still be useful to mitigate potential damage to a user's data.

The problems discussed above should be understood as being examples of problems solved by embodiments of the invention disclosed herein, and the invention should not be limited to solving the same/similar problems. The disclosed invention is applicable to address a range of problems beyond those discussed herein.

While the invention has been described with respect to a limited number of embodiments, those skilled in the art, having the benefit of this disclosure, will appreciate that other embodiments may be devised which do not depart from the scope of the technology as disclosed herein. Accordingly, the scope of the invention should be limited only by the attached claims.

What is claimed is:

1. A method for performing a backup, the method comprising:
   initiating, by a user, an initial backup of a production host;
   storing a vault copy of the initial backup's meta-data in a vault in a cyber-security module, wherein the vault is a virtualized storage for safely securing the initial backup's meta-data and wherein the vault is not connected to any internal or external networks except when receiving the vault copy or subsequent vault copies from the production host;
   periodically performing a subsequent backup of the production host, wherein the subsequent backup of the production host is performed in response to a backup policy or a request of the user;
   sending the subsequent backup's meta-data to the cyber-security module, wherein the cyber-security module compares the subsequent backup's meta-data to the vault copy of the initial backup's meta-data to determine where changes have occurred in the production host;
   sending to the cyber-security module, first portions of backup data that correspond to the determined changes in the production host shown in the subsequent backup's meta-data;
   analyzing, by the cyber-security module, the first portions of the backup data to determine when the first portions of the backup data are corrupted due to a cyber-attack;
   notifying the user when the first portions of the backup data are corrupted due to the cyber-attack;
   after notifying the user when the first portions are corrupted:
      sending to the cyber-security module, a second portion of the backup data that does not correspond to the determined changes in the production host shown in the subsequent backup's meta-data; and
      analyzing, by the cyber-security module, the second portion of the backup data that does not correspond to the determined changes in the production host to determine when any third portion of the second portion is corrupted due to the cyber-attack, wherein the user is notified when it is determined that any third portion of the second portion is corrupted due to the cyber-attack.

2. The method of claim 1, wherein the second portion of the backup data that does not correspond to the determined changes in the production host comprises of less than all of the first portions of the backup data that do not correspond to the determined changes in the production host.

3. The method of claim 2, wherein the second portion of the backup data that does not correspond to the determined changes in the production hostis selected randomly from all the first portions of the backup data that do not correspond to the determined changes in the production host.

4. The method of claim 2, wherein the second portion of the backup data that does not correspond to the determined changes in the production host is a predetermined percentage of all of the first portions of the backup data that do not correspond to the determined changes in the production host.

5. The method of claim 4, wherein the predetermined percentage is determined by the user when the backup is configured.

6. The method of claim 5, wherein if the cyber-security module detects that the second portion of the backup data that does not correspond to the determined changes in the production host includes corruption, the predetermined percentage is increased by a predetermined amount.

7. A non-transitory computer readable medium comprising computer readable program code, which when executed by a computer processor enables the computer processor to perform a method for performing a backup, the method comprising:
   initiating, by a user, an initial backup of a production host;
   storing a vault copy of the initial backup's meta-data in a cyber-security module's vault, wherein the vault is a virtualized storage for safely securing the initial backup's meta-data and wherein the vault is not connected to any internal or external networks except when receiving the vault copy or subsequent vault copies from the production host;
   periodically performing a subsequent backup of the production host, wherein the subsequent backup of the production host is performed in response to a backup policy or a request of the user;
   sending the subsequent backup's meta-data to a cyber-security module, wherein the cyber-security module compares the subsequent backup's meta-data to the vault copy of the initial backup's meta-data to determine where changes have occurred in the production host;
   sending, to the cyber-security module, first portions of backup data that correspond to the determined changes in the production host shown in the subsequent backup's meta-data;
   analyzing, by the cyber-security module, the first portions of the backup data to determine when the first portions of the backup data are corrupted due to a cyber-attack;
   notifying the user when the first portions of the backup data are corrupted due to the cyber-attack;
   after notifying the user when the first portions are corrupted:
      sending to the cyber-security module, a second portion of the backup data that does not correspond to the determined changes in the production host shown in the subsequent backup's meta-data; and
      analyzing by the cyber-security module, the second portion of the backup data that does not correspond to the determined changes in the production host to determine when any third portion of the second portion is corrupted due to the cyber-attack, wherein the user is notified when it is determined that any third portion of the second portion is corrupted due to the cyber-attack.

8. The non-transitory computer readable medium of claim 7, wherein the second portion of the backup data that does not correspond to the determined changes in the production host comprises of less than all of the first portions of the backup data of the backup that do not correspond to the determined changes in the production host.

9. The non-transitory computer readable medium of claim 8, wherein the second portion of the backup data that does not correspond to the determined changes in the production host is selected randomly from all the first portions of the backup data that do not correspond to the determined changes in the production host.

10. The non-transitory computer readable medium of claim 8, wherein the second portion of the backup data that does not correspond to the determined changes in the production host is a predetermined percentage of all of the first portions of the backup data that do not correspond to the determined changes in the production host.

11. The non-transitory computer readable medium of claim 10, wherein the predetermined percentage is determined by the user when the backup is configured.

12. The non-transitory computer readable medium of claim 11, wherein if the cyber-security module detects that the second portion of the backup data that does not correspond to the determined changes in the production host includes corruption, the predetermined percentage is increased by a predetermined amount.

13. A system comprising:
a cyber-security module;
a production host; and
a backup agent comprising:
  a processor; and
  a memory comprising instructions, which when executed by the processor, perform a method for performing a backup, the method comprising:
    initiating, by a user of the system, an initial backup of the production host;
    storing a vault copy of the initial backup's meta-data in a cyber-security module's vault, wherein the vault is a virtualized storage for safely securing the initial backup's meta-data and wherein the vault is not connected to any internal or external networks except when receiving the vault copy or subsequent vault copies from the production host;
    periodically performing a subsequent backup of the production host, wherein the subsequent backup of the production host is performed in response to a backup policy or a request of the user;
    sending the subsequent backup's meta-data to the cyber-security module, wherein the cyber-security module compares the subsequent backup's meta-data to the vault copy of the initial backup's meta-data to determine where changes have occurred in the production host;
    sending to the cyber-security module, first portions of backup data that correspond to the determined changes in the production host shown in the subsequent backup's meta-data;
    analyzing, by the cyber-security module, the first portions of the backup data to determine when the first portions of the backup data are corrupted due to a cyber-attack; and
    notifying the user when the first portions of the backup data are corrupted due to the cyber-attack;
    after notifying the user when the first portions are corrupted:
      sending to the cyber-security module, a second portion of the backup data that does not correspond to the determined changes in the production host shown in the subsequent backup's meta-data; and
      analyzing by the cyber-security module, the second portion of the backup data that does not correspond to the determined changes in the production host to determine when any third portion of the second portion is corrupted due to the cyber-attack, wherein the user is notified when it is determined that any third portion of the second portion is corrupted-due to the cyber-attack.

14. The system of claim 13, wherein the second portion of the backup data that does not correspond to the determined changes in the production host comprises of less than all of the first portions of the backup data that do not correspond to the determined changes in the production host.

15. The system of claim 14, wherein the second portion of the backup data that does not correspond to the determined changes in the production hostis selected randomly from all the first portions of the backup data that do not correspond to the determined changes in the production host.

16. The system of claim 14, wherein the second portion of the backup data that does not correspond to the determined changes in the production host is a predetermined percentage of all of the first portions of the backup data that do not correspond to the determined changes in the production host.

17. The system of claim 16, wherein the predetermined percentage is determined by the user when the backup is configured.

* * * * *